(12) United States Patent
Smith et al.

(10) Patent No.: US 8,479,498 B2
(45) Date of Patent: Jul. 9, 2013

(54) METHOD OF MIXING EXHAUST GAS EXITING AN EXHAUST STACK OUTLET WITH COOLING AIR EXITING A COOLING PACKAGE OUTLET INCLUDING A REGENERATION CONTROL ALGORITHM AND MACHINE USING SAME

(75) Inventors: Sage Frederick Smith, Apex, NC (US); John Edward Preble, Jr., Fuquay Varina, NC (US)

(73) Assignee: Caterpillar SARL, Geneva (CH)

( * ) Notice: Subject to any disclaimer, the term of this patent is extended or adjusted under 35 U.S.C. 154(b) by 434 days.

(21) Appl. No.: 12/938,775

(22) Filed: Nov. 3, 2010

(65) Prior Publication Data

US 2012/0102919 A1    May 3, 2012

(51) Int. Cl.
*F01N 3/05* (2006.01)

(52) U.S. Cl.
USPC ............... 60/295; 60/274; 60/297; 60/298; 60/311; 60/317; 60/320

(58) Field of Classification Search
USPC ............... 60/274, 286, 295, 297, 298, 311, 60/316, 317, 320
See application file for complete search history.

(56) References Cited

U.S. PATENT DOCUMENTS

| | | | |
|---|---|---|---|
| 2,112,534 A | 3/1938 | Keen | |
| 2,927,422 A | 3/1960 | Shaffer et al. | |
| 3,866,580 A | 2/1975 | Whitehurst et al. | |
| 4,907,546 A | 3/1990 | Ishii et al. | |
| 5,904,042 A | 5/1999 | Rohrbaugh | |
| 6,092,616 A * | 7/2000 | Burris et al. | 180/68.1 |
| 6,216,778 B1 | 4/2001 | Corwin et al. | |
| 6,267,106 B1 | 7/2001 | Feucht | |
| 6,832,872 B2 | 12/2004 | Koelm et al. | |
| 7,207,172 B2 | 4/2007 | Willix et al. | |
| 7,530,221 B2 | 5/2009 | Winsor | |
| 7,779,961 B2 | 8/2010 | Matte | |
| 2007/0144463 A1 * | 6/2007 | Keane et al. | 123/41.29 |
| 2007/0163247 A1 | 7/2007 | Ryan et al. | |
| 2008/0282688 A1 | 11/2008 | Bradley et al. | |
| 2010/0000205 A1 | 1/2010 | Freese | |

(Continued)

FOREIGN PATENT DOCUMENTS

| | | |
|---|---|---|
| DE | 1576781 | 3/1970 |
| EP | 1744027 | 1/2007 |

(Continued)

*Primary Examiner* — Thomas Denion
*Assistant Examiner* — Jorge Leon, Jr.
(74) *Attorney, Agent, or Firm* — Liell & McNeil

(57) ABSTRACT

A machine includes an internal combustion engine disposed within an engine compartment and supported on a machine frame. An exhaust stack has an inlet fluidly connected to an exhaust manifold of the internal combustion engine and an outlet in fluid communication with ambient air. A diesel particulate filter is disposed along the exhaust stack, and the machine includes an active regeneration system for regenerating the diesel particulate filter. A cooling package including at least one heat exchanger and a blower fan. The blower fan is configured to blow cooling air from the engine compartment sequentially through the at least one heat exchanger and an outlet of the cooling package. Exhaust gas exiting the exhaust stack outlet is mixed with the cooling air exiting the cooling package outlet in a high temperature zone surrounding the exhaust stack outlet to form a fluid mixture. An electronic control module is in control communication with the active regeneration system and includes a regeneration control algorithm operable to detect a speed of the blower fan.

20 Claims, 7 Drawing Sheets

U.S. PATENT DOCUMENTS

| | | |
|---|---|---|
| 2010/0043412 A1 | 2/2010 | Dickinson et al. |
| 2010/0083647 A1 | 4/2010 | Dickinson et al. |
| 2012/0102918 A1 * | 5/2012 | Smith et al. .................... 60/273 |

FOREIGN PATENT DOCUMENTS

| | | |
|---|---|---|
| EP | 1770249 | 4/2007 |
| EP | 1911944 | 4/2008 |
| EP | 2211038 | 7/2010 |
| FR | 2170753 | 9/1973 |
| JP | 2010024858 | 2/2010 |
| JP | 2010127288 | 6/2010 |
| JP | 2010229876 | 10/2010 |

* cited by examiner

METHOD OF MIXING EXHAUST GAS EXITING AN EXHAUST STACK OUTLET WITH COOLING AIR EXITING A COOLING PACKAGE OUTLET INCLUDING A REGENERATION CONTROL ALGORITHM AND MACHINE USING SAME

TECHNICAL FIELD

The present disclosure relates generally to the mixing of exhaust gas exiting an exhaust stack outlet with cooling air exiting a cooling package outlet to form a fluid mixture, and more particularly to maintaining a reduced temperature of the fluid mixture within a high temperature zone surrounding the exhaust stack outlet during diesel particulate filter regeneration.

BACKGROUND

Skid steer machines are relatively compact, low profile machines that offer high maneuverability and enable operation in relatively small areas. They typically include an operator seat oriented in a position providing a view immediately in front of the skid steer machine. Also typical of skid steer designs is the location of the lift arms for carrying and lifting a material handling bucket, also referred to as a loader, or other implement. The lift arms typically extend longitudinally on both sides of and immediately adjacent the operator seat. An operator cage, therefore, is typically provided to ensure against an operator inadvertently extending a hand or limb to the side and into the path of the lift arms. Due to the location of the lift arms, the operator enclosure is typically entered from the front of the machine, across the bucket or other implement that is carried by the lift arms.

A rear mounted engine compartment is positioned behind the operator cage and is limited in space due to the small size and low profile design of the skid steer machines. Recent governmental regulations have prompted development and application of exhaust aftertreatment systems to reduce particulate matter emissions from many on-highway and off-highway vehicles, including skid steer machines. Exhaust aftertreatment systems for diesel engines typically include a diesel particulate filter. A diesel particulate filter generally consists of a ceramic honeycomb structure that is surrounded by a non-permeable skin layer and includes numerous channels that are blocked at alternate ends. This structure forces exhaust gas to flow through the porous walls between the channels, leaving particulate matter deposited on the walls. Periodically, or once a substantial amount of particulate matter is collected within the diesel particulate filter, it must be cleaned out to prevent blockage. The process of removing the accumulated particulate matter from the diesel particulate filter is referred to generally as regeneration.

U.S. Publication No. 2010/0043412 to Dickinson et al. discloses an exhaust diffuser for a truck that is configured to reduce exhaust temperatures during regeneration of a diesel particulate filter. Specifically, the exhaust diffuser generally includes a venturi opening and a mixing section located downstream from the venturi opening. The mixing section includes a multiplicity of holes for diffusing and diluting the exhaust gases to the atmosphere. The cited reference, however, does not disclose a strategy for packaging a diesel particulate filter within a skid steer machine and/or a strategy for directing airflow relative to the diesel particulate filter.

The present disclosure is directed to one or more of the problems set forth above.

SUMMARY OF THE DISCLOSURE

In one aspect, a machine includes an internal combustion engine disposed within an engine compartment and supported on a machine frame. An exhaust stack has an inlet fluidly connected to an exhaust manifold of the internal combustion engine and an outlet in fluid communication with ambient air. A diesel particulate filter is disposed along the exhaust stack, and the machine includes an active regeneration system for regenerating the diesel particulate filter. A cooling package including at least one heat exchanger and a blower fan. The blower fan is configured to blow cooling air from the engine compartment sequentially through the at least one heat exchanger and an outlet of the cooling package. Exhaust gas exiting the exhaust stack outlet is mixed with the cooling air exiting the cooling package outlet in a high temperature zone surrounding the exhaust stack outlet to form a fluid mixture. An electronic control module is in control communication with the active regeneration system and includes a regeneration control algorithm operable to detect a speed of the blower fan.

In another aspect, a method of operating a machine includes exhausting cooling air from a blower fan through a cooling package outlet. Exhaust gas is exhausted through an exhaust stack outlet at an exhaust temperature above 300 degrees Celsius. The exhaust gas is mixed with the cooling air in a high temperature zone surrounding the exhaust stack outlet to form a fluid mixture. The method also includes executing a regeneration detection algorithm on the electronic control module, and executing a regeneration control algorithm on the electronic control module.

DETAILED DESCRIPTION

Figure 1:
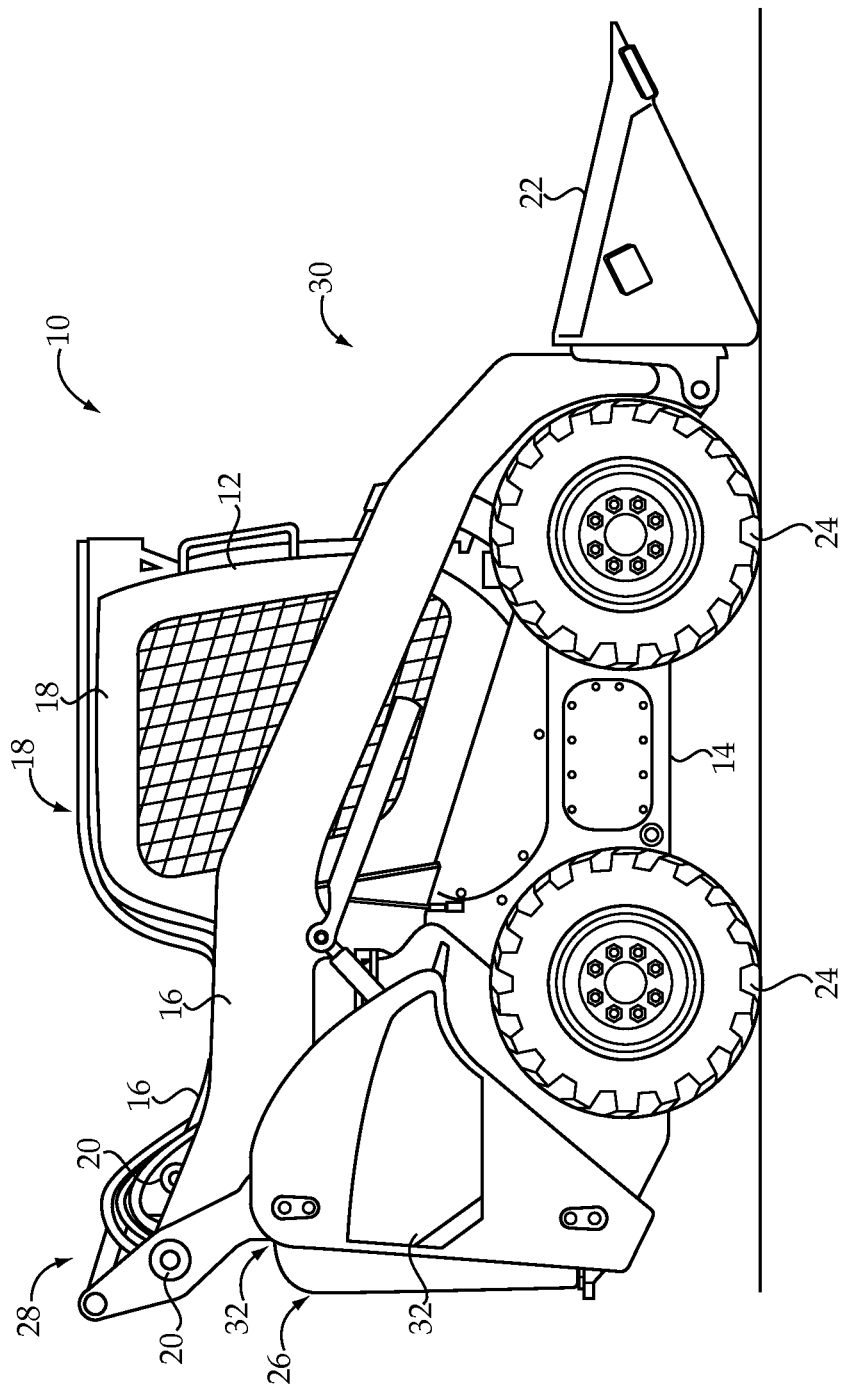
FIG. 1 is a perspective view of a skid steer machine, according to one embodiment of the present disclosure.

An exemplary embodiment of a skid steer machine 10 according to the present disclosure is shown generally in FIG. 1. The skid steer machine 10, also referred to as a skid steer loader, generally includes an operator cage 12 supported on a skid steer machine frame 14. A pair of lift arms 16 are pivotably attached to the skid steer machine frame 14 and extend longitudinally on both sides 18 of the operator cage 12. The lift arms 16 attach at pivot points 20 behind the operator cage 12 of the skid steer machine 10, and may support a bucket 22, or loader, or a variety of other implements or attachments, such as, for example, pallet forks, brooms, grinders, tillers, rakes, blades, or augers. The skid steer machine 10 may be propelled by a first set of wheels 24 on one side of the machine 10 that are driven independently from a second set of wheels (not shown) on the other side of the machine 10. Alternatively, however, the skid steer machine 10 according to the present disclosure may have a tracked undercarriage, and may, outside of this document, be referred to as a multi-terrain loader or a compact loader.

The skid steer machine 10 also includes a rear mounted engine compartment 26 supported on the skid steer machine frame 14. "Rear mounted," as used herein with reference to the engine compartment 26, means that the engine compartment 26 is positioned closer to a back end 28 of the skid steer machine 10 than a front end 30 of the machine 10, and, more specifically, is mounted behind the operator cage 12 relative to the front end 30 of the machine 10. The rear mounted engine compartment 26 will be discussed in greater detail with reference to FIG. 2 and may include a pair of sidewalls 32, as shown in the exemplary embodiment.

Figure 2:
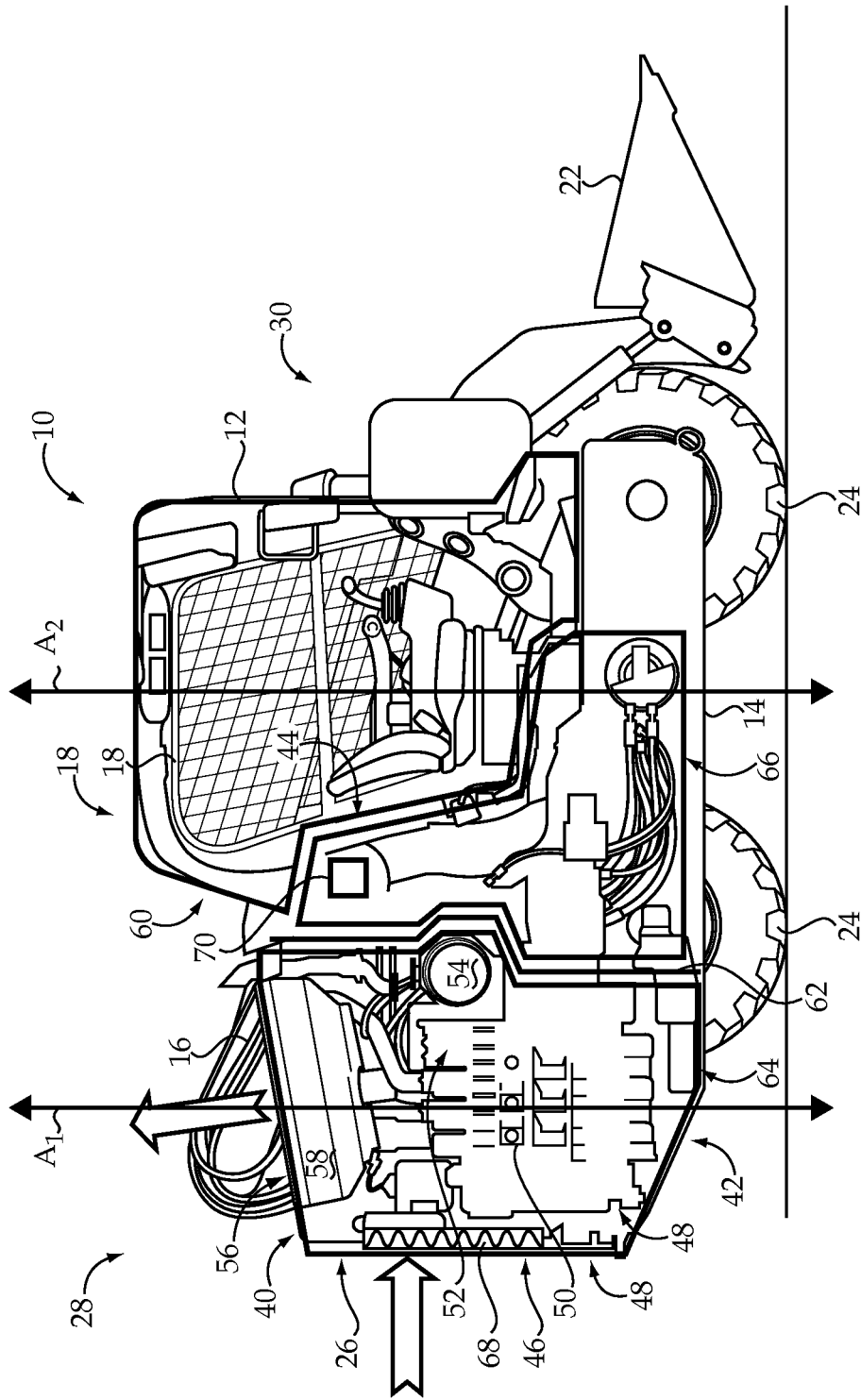
FIG. 2 is a side diagrammatic view of the skid steer machine of FIG. 1, having portions removed to reveal internal components of the machine, according to one aspect of the present disclosure.

Turning now to FIG. 2, the rear mounted engine compartment 26 of the skid steer machine 10 is shown, with portions of the skid steer machine 10, including sidewall 32 and lift arm 16, removed to expose internal components of the machine 10. The rear mounted engine compartment 26 may generally include at least those engine components positioned adjacent or within an area defined by a top portion 40, bottom portion 42, front portion 44, back portion 46, and side portions 48 of the engine compartment 26. According to one aspect of the present disclosure, the rear mounted engine compartment 26 includes at least an internal combustion engine 50, an exhaust system 52 including a diesel particulate filter 54, and a cooling system 56 including a cooling package 58, all of which will be discussed later in greater detail. Although only a few components within the rear mounted engine compartment 26 will be specifically discussed herein, it should be appreciated that the rear mounted engine compartment 26 may include additional systems and components, depending on a particular application.

The cooling package 58 may define at least a portion of the top portion 40 of the rear mounted engine compartment 26, while a portion of the skid steer machine frame 14 may generally define the bottom portion 42 of the rear mounted engine compartment 26. The front portion 44 of the rear mounted engine compartment 26 may be defined by a rear wall 60 of the operator cage 12 or, alternatively, by a firewall 62, which may be positioned between the diesel particulate filter 54 and the rear wall 60. According to the exemplary embodiment, the firewall 62 may be positioned to separate certain systems and/or components within the rear mounted engine compartment 26. For example, the internal combustion engine 50, diesel particulate filter 54, and other high temperature components may be positioned on a high temperature side 64 of the firewall 62, while temperature sensitive components, such as, for example, electrical, hydraulic, and HVAC components, may be positioned on a shielded side 66 of the firewall 62. It is recommended that certain temperature sensitive components, such as, for example, electronic controllers, relays, harnesses, fuses, batteries, and plastic or rubber components, not be placed within 12 to 24 inches from the diesel particulate filter 54 without appropriate shielding or insulation. A rear facing grille 68 is positioned at, and may define at least a portion of, the back portion 46 of the rear mounted engine compartment 26, and may include a framework or structure for covering the back portion 46 of the rear mounted engine compartment 26 while still allowing the passage of air therethrough. The sidewalls 32, shown generally in FIG. 1, may define the side portions 48 of the rear mounted engine compartment 26.

The skid steer machine 10 may also include at least one electronic control module 70 in control communication with one or more components of the skid steer machine 10, including components of the rear mounted engine compartment 26. The electronic control module 70 may be positioned on the shielded side 66 of the firewall 62 and, thus, may be protected from high temperatures within the rear mounted engine compartment 26. The electronic control module 70, and any other electronic control modules described herein, may be of standard design and may generally include a processor, such as, for example, a central processing unit, a memory, and an input/output circuit that facilitates communication internal and external to the electronic control module 70. The central processing unit may control operation of the electronic control module 70 by executing operating instructions, such as, for example, programming code stored in memory, wherein operations may be initiated internally or externally to the electronic control module 70. A control scheme may be utilized that monitors outputs of systems or devices, such as, for example, sensors, actuators, or control units, via the input/output circuit to control inputs to various other systems or devices.

The memory may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices located internally or externally to the electronic control module 70. One skilled in the art will appreciate that any computer-based system utilizing similar components is suitable for use with the present disclosure.

Figure 3:
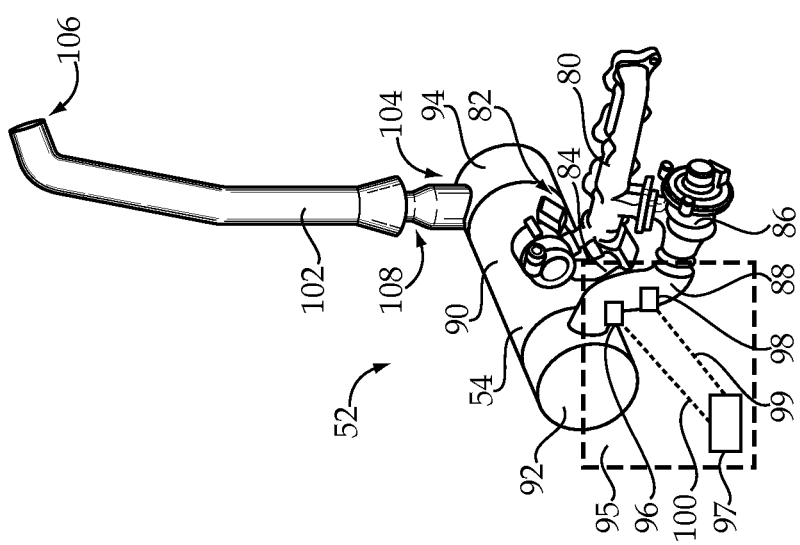
FIG. 3 is a perspective view of the exhaust system depicted in FIG. 2.

Turning now to FIG. 3, and referring also to FIG. 2, the exhaust system 52 of the skid steer machine 10 may include an exhaust manifold 80 fluidly connected to the internal combustion engine 50. According to the exemplary embodiment, a portion of exhaust gas exiting the internal combustion engine 50 may be routed through an exhaust gas recirculation system 82. Exhaust gas recirculation systems, such as system 82, are known and may include an exhaust gas recirculation conduit 84, and one or more additional components, through which the exhaust gas is routed before being reintroduced into the internal combustion engine 50. Although an exhaust gas recirculation system 82 is shown, it should be appreciated that the exhaust system 52 may not include such a recirculation system and, therefore, all of the exhaust gas may be directed out of the rear mounted engine compartment 26.

All or a portion of the exhaust gas may be routed through a turbocharger 86, along an exhaust gas conduit 88, and then through the diesel particulate filter 54 before being expelled from the skid steer machine 10. Specifically, all or a portion of the exhaust gas leaving the exhaust manifold 80 may pass through a turbine wheel of the turbocharger 86 to make it rotate. The rotation of the wheel turns a shaft, which, in turn, rotates a compressor wheel of the turbocharger 86. The rotation of the compressor wheel pulls in ambient air and compresses it before it is introduced into the internal combustion engine 50. From the turbine portion of the turbocharger 86, the exhaust gas flows through the exhaust gas conduit 88 and into the diesel particulate filter 54.

The diesel particulate filter 54, which may have a substantially horizontal orientation with a centerline oriented transverse to a fore-aft line, as shown, may generally include a container 90, or can, having a gas inlet 92 and a gas outlet 94. According to one embodiment, the can 90 may support a ceramic honeycomb structure that is surrounded by a non-permeable skin layer and includes numerous channels that are blocked at alternate ends. This structure forces exhaust gas to flow through the porous walls between the channels, leaving particulate matter deposited on the walls. Periodically, or once a substantial amount of particulate matter is collected within the diesel particulate filter 54, it must be cleaned out to prevent blockage. The process of removing the accumulated particulate matter, or soot, from the diesel particulate filter 54 is referred to generally as regeneration.

Regeneration may be either passive or active. Passive regeneration takes place automatically when the exhaust temperature is high enough, while active regeneration includes a variety of means for actively increasing the exhaust temperature to perform regeneration. For example, an active regeneration system 95 may employ a heating device 96, fuel burner, or catalytic oxidizer to increase the exhaust temperature. Further, an electronic control module 97 may be in control communication with a sensor 98, such as a backpressure sensor or temperature sensor, via one or more communication channels 99 to detect a soot buildup threshold within the diesel particulate filter 54 and may be operable to initiate regeneration by communicating with heating device 96 via one or more communication channels 100. Whatever strategy is used to regenerate the diesel particulate filter 54, it should be appreciated that the exhaust gas and/or diesel particulate filter 54, may be heated to very high temperatures.

From the diesel particulate filter 54, the exhaust gas may be routed through an exhaust stack 102 having a first end 104 attached to the diesel particulate filter 54 and a second end 106 positioned through the top portion 40 of the rear mounted engine compartment 26 (shown in FIG. 2). Specifically, the exhaust stack second end 106, or outlet, may be in fluid communication with ambient air. As shown, the exhaust stack 102 may include a venturi opening 108. A venturi opening 108, the use of which is well known in the art, draws in air from the rear mounted engine compartment 26 to cool the exhaust gas. According to the exemplary embodiment, the exhaust gas, which may be cooled by engine compartment air entrained into the exhaust gas through the venturi opening 108, is exhausted upward through the top portion 40 of the rear mounted engine compartment 26. Specifically, the exhaust gas may be exhausted predominantly vertically relative to the skid steer machine frame 14. However, the exhaust gas may be directed from the diesel particulate filter 54 through other portions of the rear mounted engine compartment 26.

According to one aspect of the present disclosure, and referring also to FIG. 2, the diesel particulate filter 54 is positioned between the internal combustion engine 50 and the operator cage 12. As used herein, "between" means in the space separating two objects. Specifically, the diesel particulate filter 54 is between the internal combustion engine 50 and operator cage 12, and within the rear mounted engine compartment 26. More specifically, the diesel particulate filter 54 may be positioned between a vertical central axis $A_1$ of the internal combustion engine 50 and a vertical central axis $A_2$ of the operator cage 12, and within the rear mounted engine compartment 26. The significance of the packaging of the diesel particulate filter 54 within the rear mounted engine compartment 26 will be discussed in greater detail below.

Figure 4:
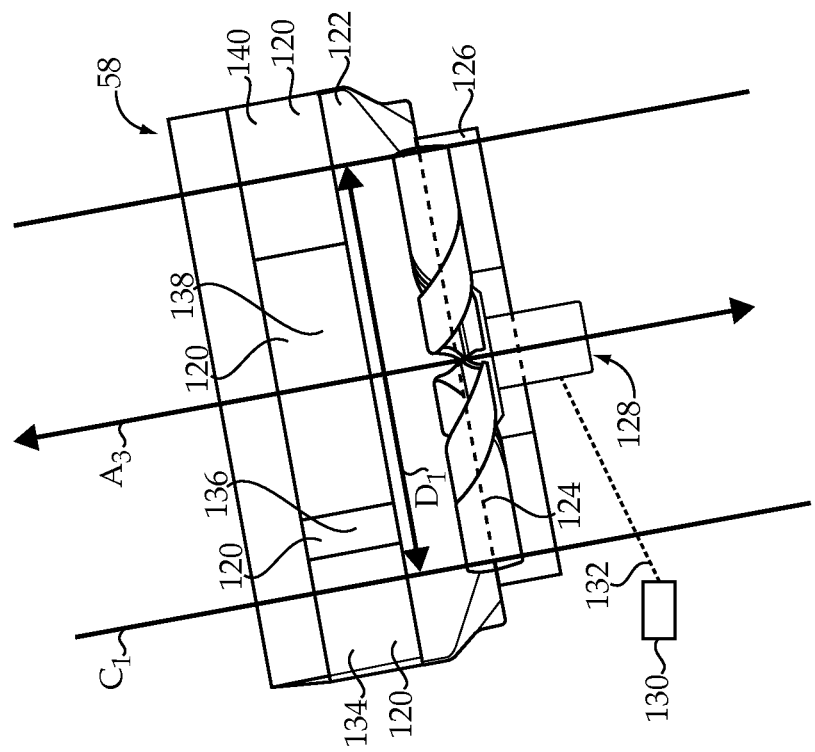
FIG. 4 is a side diagrammatic view of the cooling package depicted in FIG. 2.

Turning now to FIG. 4, and referring also to FIG. 2, the cooling package 58 of cooling system 56, according to one aspect of the present disclosure, is shown in greater detail. The cooling package 58 may generally include one or more heat exchangers 120 positioned in parallel with respect to an airflow. A shroud 122 may be connected to at least one of the heat exchangers 120, and a blower fan 124 may be positioned within the shroud 122. In addition, a grille 126 may be positioned around the blower fan 124 and connected to the shroud 122. The blower fan 124 may be driven by a drive mechanism 128, which may include any means for rotating the blower fan 124, such as, for example, an electric motor or a hydraulic motor. Alternatively, the blower fan 124 may be rotatably driven by the internal combustion engine 50. According to one embodiment, the blower fan 124 may be electronically controlled, meaning that it is in control communication with an electronic control module 130 via one or more communication channels 132.

According to this aspect of the present disclosure, the cooling package 58 has a predominantly horizontal orientation, meaning that it is more horizontal than it is vertical, and the blower fan 124 has a central axis $A_3$ that is predominantly vertical relative to the skid steer machine frame 14. The blower fan 124 is configured to blow air from the rear mounted engine compartment 26 sequentially through the one or more heat exchangers 120 and the top portion 40 of the rear mounted engine compartment 26. According to one embodiment, the cooling package 58 may include a charge air cooler 134, a fuel cooler 136, a radiator 138, and a hydraulic oil cooler 140 arranged in parallel, or positioned along a single plane, with regard to an airflow. However, it should be appreciated that the cooling package 58 may include any number of heat exchangers 120, each of which may be different than those described herein.

Additionally, the cooling package 58 may be positioned at a higher location within the rear mounted engine compartment 26 than the diesel particulate filter 54. As used herein, "positioned at a higher location," with respect to the cooling package 58, means that the cooling package 58 is situated above or elevated relative to the diesel particulate filter 54. Specifically, the cooling package 58 is positioned above the diesel particulate filter 54 relative to a gravitational pull. In addition to being positioned at a higher location than the diesel particulate filter 54, the blower fan 124 of the cooling package 58 may be positioned substantially above the diesel particulate filter 54. Specifically, a cylinder $C_1$ defined by a diameter $D_1$ of the blower fan 124 and extending downward through the lower portion 42 of the rear mounted engine compartment 26 may enclose at least a portion of the diesel particulate filter 54. The airflow within the rear mounted engine compartment 26 resulting from the positioning of the cooling package 58 relative to the diesel particulate filter 54 will be discussed below in greater detail.

Specifically, and referring to FIGS. 2-4, when the skid steer machine 10 is operated, the rear mounted engine compartment 26 may be cooled using ambient air pulled around the internal combustion engine 50 and the diesel particulate filter 54 by the blower fan 124 of the cooling package 58. Specifically, ambient air may be drawn sequentially through the rear facing grille 68 and the rear mounted engine compartment 26 using the blower fan 124. According to one embodiment, ambient air may be blocked from being drawn in through first and second sides 48 of the rear mounted engine compartment 26 using the pair of sidewalls 32 (shown in FIG. 1). Ambient air may also be significantly blocked from entering the rear mounted engine compartment 26 through the bottom portion 42 of the engine compartment 26 by the skid steer machine frame 14. Therefore, ambient air may generally travel through the rear facing grille 68 and be pulled upward through the cooling package 58 and the top portion 40 of the rear mounted engine compartment 26 using the blower fan 124 of the cooling package 58 and the venturi opening 108 of the exhaust stack 102.

Heat transmission into the operator cage 12 may be reduced using a double wall arrangement. The double wall arrangement may include the rear wall 60 of the operator cage 12 and the firewall 62 positioned near the front portion 44 of the rear mounted engine compartment 26 between the diesel particulate filter 54 and the rear wall 60. Such an arrangement may be particularly useful during regeneration of the diesel particulate filter 54, when exhaust temperatures may reach 600 degrees Celsius or higher. In addition to protecting operators seated in the operator cage 12 from high temperature exposure, it should be appreciated that the diesel particulate filter packaging arrangement described herein also reduces high temperature exposure for bystanders. Specifically, the diesel particulate filter 54 may be sufficiently shielded using the internal combustion engine 50, sidewalls 32, and firewall 62. However, the diesel particulate filter 54 may still be accessed for maintenance purposes and the like via the rear wall 60 and firewall 62. Further, additional components that may be accessed frequently for maintenance or other purposes may be positioned a sufficient distance from the diesel particulate filter 54 to avoid high temperature exposure. For example, for maintenance of the skid steer machine 10, an operator probably should not reach across or be within 12 inches of the diesel particulate filter 54 when touching components such as the engine oil dipstick, engine oil fill, engine oil filter, hydraulic oil filter, coolant overflow bottle, fuel fill, fuel filter/water separator, or air cleaner, without insulating or guarding the diesel particulate filter 54.

Figure 5:
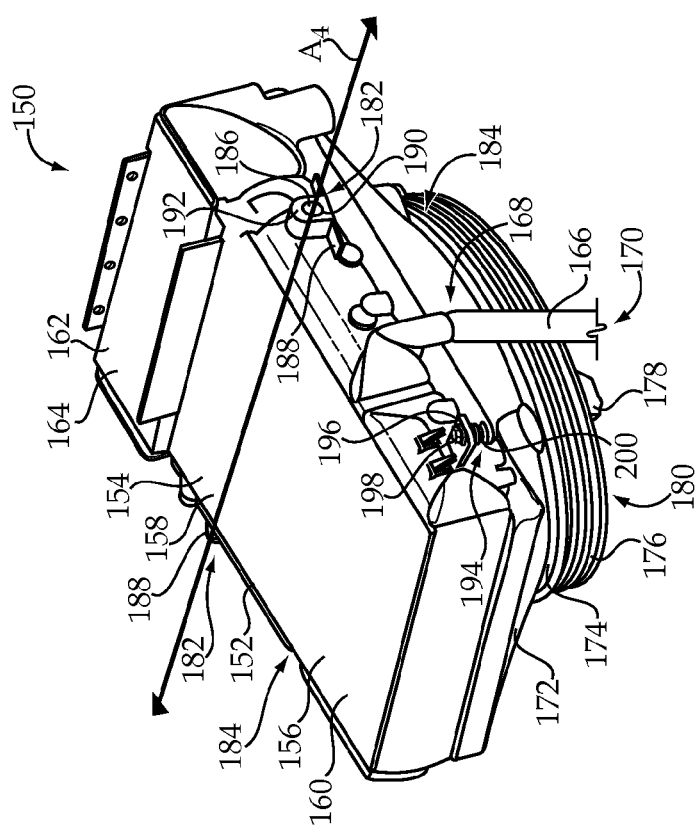
FIG. 5 is a perspective view of a cooling package including a unitary assembly, according to another aspect of the present disclosure.

Another aspect of the present disclosure is shown generally in FIG. 5, with reference also being made to FIGS. 1 and 2. Specifically, a cooling package 150 comprised of a unitary assembly 152 that may be pivotably mounted to the skid steer machine frame 14 is shown. The unitary assembly 152 may include at least a first heat exchanger 154 and a second heat exchanger 156 positioned in parallel with respect to an airflow. For example, the first heat exchanger 154 may include a radiator 158, while the second heat exchanger 156 may include a hydraulic oil cooler 160. An additional heat exchanger 162, such as, for example, an air to air aftercooler 164, may also be provided, and may be positioned in parallel with the first and second heat exchangers 154 and 156 with respect to an airflow. Although specific heat exchangers are described, it should be appreciated that the cooling package 150 described herein may include any number and/or arrangement of heat exchangers positioned in parallel with respect to an airflow. The unitary assembly 152 may also include at least one heat exchanger hose 166 having a first end 168 attached to one of the heat exchangers, namely heat exchanger 154, and a second end 170 free from attachment. Additional hoses or conduits may also be provided for properly connecting components of the unitary assembly 152 with the skid steer machine 10. A shroud 172 may be connected to one or more of the heat exchangers 154, 156, and 162 and, preferably, is connected to each of the heat exchangers 154, 156, and 162, as shown. A blower fan 174 is positioned within the shroud 172, and is shielded using a grille 176 positioned around the blower fan 174 and connected to the shroud 172. A drive mechanism 178, such as a motor or engine or other similar mechanism, has an output 180 connected to the blower fan 174.

The unitary assembly 152 may be pivotably mounted to the skid steer machine frame 14 using at least one pivotable mounting assembly 182. For example, the unitary assembly 152 may include a pair of pivotable mounting assemblies 182 positioned at opposing sides 184 of the cooling package 150 and oriented along a centrally located pivot axis $A_4$. As such, the cooling package 150 may be pivotable about the centrally located pivot axis $A_4$, when mounted to the skid steer machine frame 14. The centrally located pivot axis $A_4$ may be sufficiently close to a center of mass of the cooling package 150 that a force required to move the cooling package 150 from an operational position to a maintenance position, both of which are discussed below, is less than a maximum operator required force. For example, a maximum operator required force may be 35 pounds, or any other weight below which it is assumed an operator will be able to lift without any assistance.

According to the exemplary embodiment, each of the pair of pivotable mounting assemblies 182 includes a cooling package portion 186 and a skid steer machine frame portion 188. Specifically, the cooling package portion 186 may include an axle 190 extending outwardly from the cooling package 150 and defining the centrally located pivot axis $A_4$. The skid steer machine frame portion 188 may include any fastening feature, such as screws, bolts, nuts, washers, and the like, suitable for connecting the cooling package portion 186 with the skid steer machine frame portion 188. It should be appreciated that the "cooling package portion," as used herein, may represent one or more features of a mounting assembly that are attached to or integral with the cooling package 150, while the "skid steer machine frame portion," may represent one or more features of a mounting assembly that are attached to or integral with the skid steer machine frame 14. The skid steer machine frame 14, with reference to at least this aspect of the present disclosure, may include sidewalls 32.

The cooling package 150 also includes at least one non-metallic vibration isolator, such as a rubber vibration isolator, positioned between the cooling package 150 and the skid steer machine frame 14 for isolating the cooling package 150 from vibrations of the skid steer machine frame 14 while the skid steer machine 10 is being operated or, more specifically, while the internal combustion engine 50 is running. According to the exemplary embodiment, a plurality of non-metallic vibration isolation elements may be utilized. For example, a non-metallic vibration isolation element 192 may be positioned between the cooling package portion 186 and the skid steer machine frame portion 188 of the pivotable mounting assemblies 182. Specifically, each of the outwardly extending axles 190 may be rotated within the non-metallic vibration isolation element 192 in order to pivot the cooling package 150. Further, skid steer machine frame portion 188 may include a fastening feature for securing the non-metallic vibration isolation element 192, and outwardly extending axle 190 positioned therein, to the skid steer machine frame 14.

Figure 6:
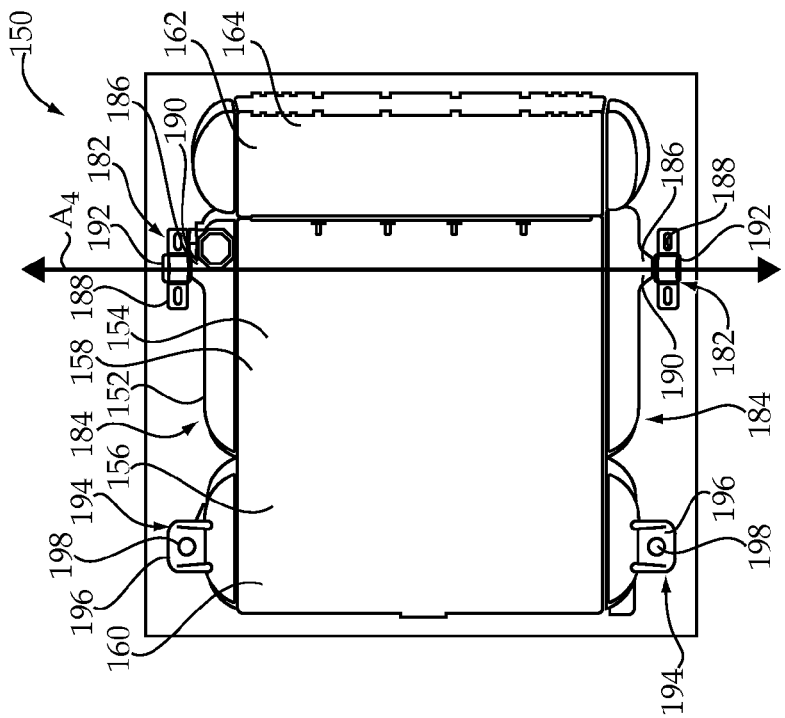
FIG. 6 is a top diagrammatic view of the cooling package of FIG. 5.

Referring also to FIG. 6, the cooling package 150 may also include a pair of stationary mounting assemblies 194 positioned on the opposing sides 184 of the cooling package 150 for fixedly attaching the cooling package 150 to the skid steer machine frame 14. Each of the pair of stationary mounting assemblies 194 may include a cooling package portion 196 and a skid steer machine frame portion 198. Further, according to the exemplary embodiment, a non-metallic vibration isolation element 200, which may be made from a rubber or other elastic material, may be positioned between the cooling package portion 196 and the skid steer machine frame portion 198. According to one embodiment, the cooling package portion 196 may include a flange having an opening therethrough for receiving a fastener or other similar device. The skid steer machine frame portion 198 may include a fastener, which may include any known fastening device, for attaching the cooling package 150 to the skid steer machine frame 14 and securing the non-metallic vibration isolation element 200 therebetween.

Figure 8:
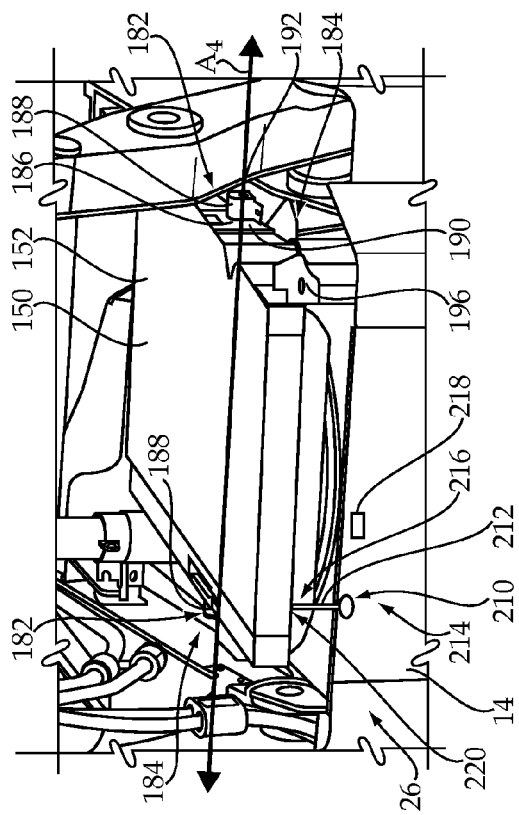
FIG. 8 is a perspective view of the cooling package of FIG. 5, shown in a maintenance position with respect to a machine.
Figure 7:
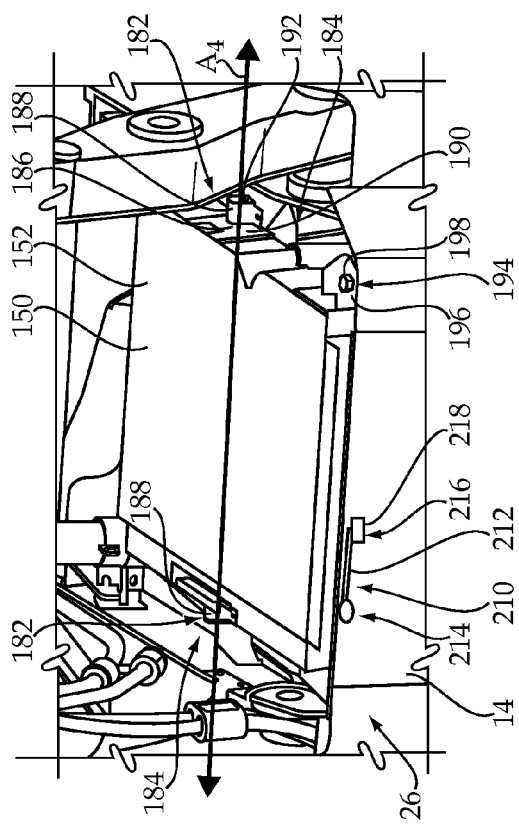
FIG. 7 is a perspective view of the cooling package of FIG. 5, shown in an operational position with respect to a machine.

Referring also to FIGS. 7 and 8, a prop rod assembly 210 may also be provided and may include a prop rod 212 having a first end 214 pivotably attached to the skid steer machine frame 14 and a second end 216 secured to the skid steer machine using a prop rod clip 218. The unitary assembly 152 may include a prop rod seating feature 220, such as, for example, an opening, for receiving the second end 216 of the prop rod 212, which may include a hooked shape. Alternatively, however, the first end 214 of the prop rod 212 may be attached to the unitary assembly 152, and secured using a prop rod clip 218, while the skid steer machine frame 14 may include the prop rod seating feature 220 for receiving the second end 216 of the prop rod 212. It should be appreciated that the prop rod assemblies are known in the art and may include any structures that are sized and positioned for securing a pivoted or upward position of a pivotable structure. Although a prop rod assembly 210 is shown, it should be appreciated that any suitable means for supporting the cooling package 150 in a pivoted position may be substituted for the prop rod assembly 210. Alternatively, however, some embodiments may not include any means for securing a pivoted position of the cooling package 150.

The cooling package 150 may be pivotable between an operational position, shown in FIG. 7, and a maintenance position, shown in FIG. 8. Specifically, in the operational position, the stationary mounting assemblies 194 may be secured such that the non-metallic vibration isolation elements 200 (shown in FIG. 5) may be distorted in compression while the cooling package 150 is maintained in the operational position. When the skid steer machine 10 is operated, and the internal combustion engine 50 is running, the non-metallic vibration isolation elements 192 (shown in FIG. 5) and 200 of both the pivotable mounting assemblies 182 and the stationary mounting assemblies 194, respectively, may isolate the cooling package 150 from vibrations of the skid steer machine 10 or, more specifically, the skid steer machine frame 14. When operation of the skid steer machine 10 is stopped, and the internal combustion engine 50 is not running, the operator may unfasten the stationary mounting assemblies 194 and pivot the cooling package 150 using the pivotable mounting assemblies 182 to the maintenance position, shown in FIG. 8.

The prop rod assembly 210, or other similar components, may be utilized to maintain the maintenance position of the cooling package 150. Specifically, the prop rod assembly 210 may be moved from a released configuration of FIG. 7, in which the cooling package 150 may remain fixed in the operational position, to an engaged configuration of FIG. 8, in which the cooling package 150 is supported in the maintenance position. While the cooling package 150 is in the maintenance position the operator may perform certain maintenance procedures on the cooling package 150 or other components of the rear mounted engine compartment 26. For example, compressed air may be directed into the rear mounted engine compartment 26 to clean dirt and debris from surfaces therein.

Referring back to FIG. 5, the unitary assembly 152 may be provided as a separate, or stand-alone, assembly. Specifically, the unitary assembly 152 will not include the skid steer machine 10, but will comprise an independent entity. The unitary assembly 152 may or may not be provided with the pivotable mounting assemblies 182 and the stationary mounting assemblies 194, or portions thereof, but will at least include the outwardly extending axles 190. According to the exemplary embodiment, one or more of the heat exchangers 154, 156, and 162 may include a casting and the outwardly extending axles 190 may be integral with the casting. For example, the radiator 158, the hydraulic oil cooler 160, and the outwardly extending axles 190 may all be formed from one casting. The air to air aftercooler 164 may be bolted onto the casting, as shown, or may also be an integral part of the casting. Additional heat exchangers may be similarly attached. When installing the unitary assembly 152 onto the skid steer machine 10, the one or more heat exchanger hoses 166 and the drive mechanism 178 may be properly connected with appropriate components of the skid steer machine 10, and may be pivotably mounted to the skid steer machine frame 14 using the pivotable mounting assemblies 182. Stationary mounting assemblies 194, if provided, may also be used to secure the unitary assembly 152 to the skid steer machine frame 14.

Although the non-metallic vibration isolation elements 192 and 200 are shown as part of the mounting assemblies 182 and 194, it should be appreciated that one or more non-metallic vibration isolators may be provided that are separate from the mounting assemblies 182 and 194. For example, one or more non-metallic vibration isolators may be provided between the cooling package 150 and the skid steer machine frame 14, and may be attached to either of the cooling package 150 and the skid steer machine frame 14. In embodiments utilizing these alternative non-metallic vibration isolators, the mounting assemblies 182 and 194 may or may not include the non-metallic vibration isolation 192 and 200.

Figure 9:
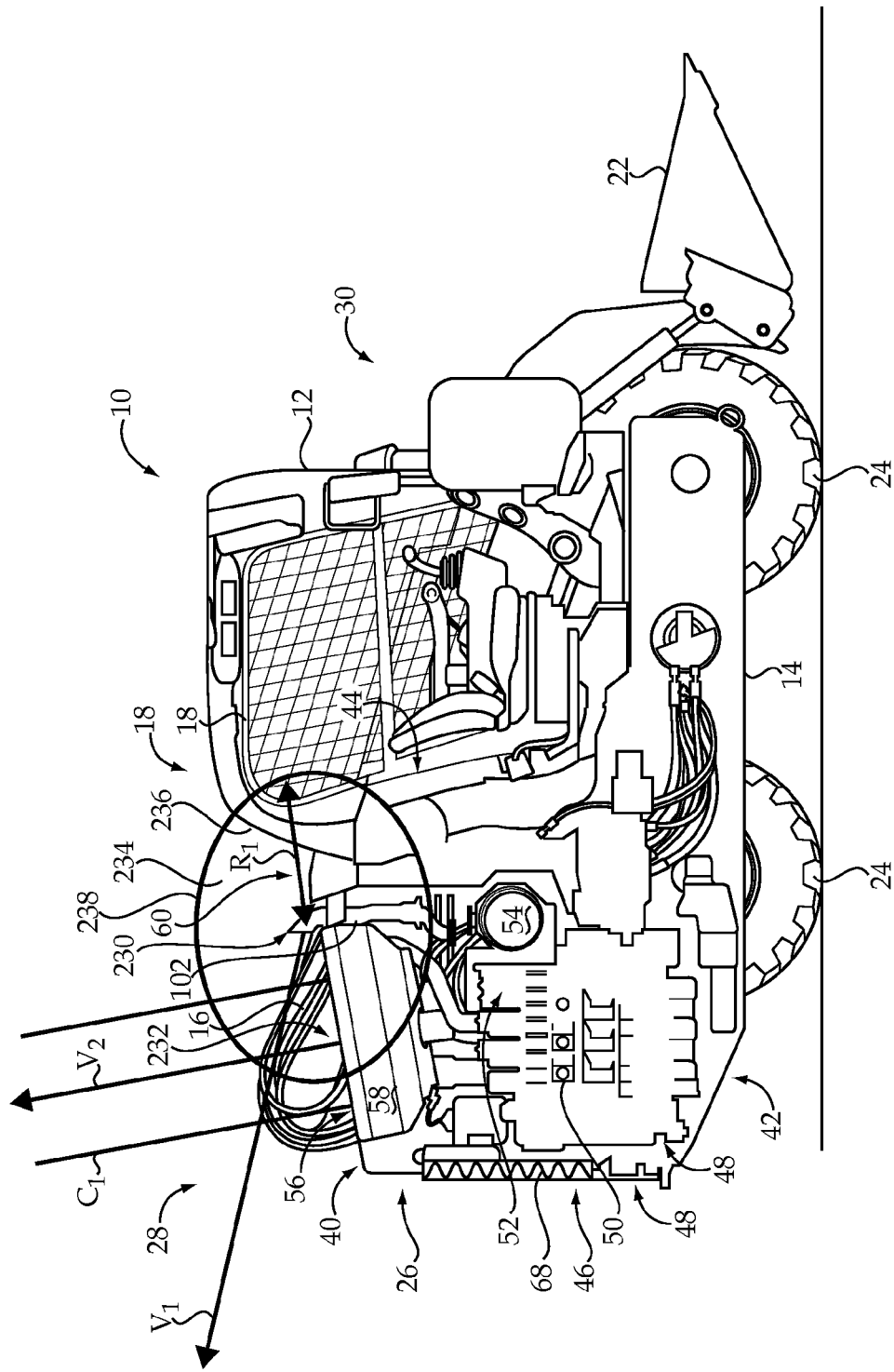
FIG. 9 is a side diagrammatic view of the skid steer machine of FIG. 1, having portions removed to better illustrate a strategy for mixing exhaust gas with cooling air, according to another aspect of the present disclosure.

Turning now to FIG. 9, an additional aspect of the present disclosure is shown. Specifically, according to the depicted embodiment, exhaust gas exiting an exhaust stack outlet 230 is mixed with cooling air exiting a cooling package outlet 232 in a high temperature zone 234 surrounding the exhaust stack outlet 230 to form a fluid mixture. Specifically, the cooling package outlet 232 and the exhaust stack outlet 230 are positioned such that the exhaust gas exiting the exhaust stack outlet 230 may define an exhaust gas vector $V_1$ that intersects an upwardly extending cylinder $C_1$ (shown also in FIG. 4) defined by the blower fan 124 (shown in FIG. 4) within the high temperature zone 234. According to a specific embodiment, the cooling air exiting the cooling package outlet 232 defines a cooling air vector $V_2$, and the exhaust gas vector $V_1$ may intersect the cooling air vector $V_2$ within the high temperature zone 234.

According to the exemplary embodiment, the high temperature zone 234 may include a sphere 236, with the exhaust stack outlet 230 defining a center of the sphere 236. According to one embodiment, a radius $R_1$ of the sphere 236 is about 18 inches. However, it should be appreciated that the positioning of the exhaust stack 102 relative to the cooling package 58, and the angle at which exhaust gas is directed into the air, or cooling air, exiting the cooling package 58 may vary. For example, such parameters may depend upon the temperatures and velocities of the air exiting each component and the desired cooling to be achieved. It should also be appreciated that, although both the exhaust gas and the cooling package air are shown as being exhausted in a substantially upward fashion, the exhaust gas and/or cooling package air may be exhausted from the machine 10 in any direction, as long as the cooling described herein is achieved.

It has been shown that by mixing the exhaust gas with the cooling package air, as described herein, temperatures less than 200 degrees Celsius at a perimeter 238 of the high temperature zone 234 may be achieved. In fact, testing has revealed that temperatures less than 150 degrees Celsius may be achieved at the perimeter 238 of the high temperature zone 234. Such temperatures may be achieved even during diesel particulate filter regeneration, such as an active regeneration, when exhaust temperatures are very high. For example, temperatures at the diesel particulate filter outlet 94 (shown in FIG. 3) may be around 600 degrees Celsius during regeneration, and around 325 degrees Celsius downstream of the venturi opening 108 (also shown in FIG. 3). Although one is not shown, it should be appreciated that a guard or other structure may be provided around the high temperature zone 234 to shield operators, bystanders, or flammable materials from the high temperatures within the high temperature zone 234.

A method of controlling a regeneration event, such as an active regeneration event facilitated by an active regeneration system, such as regeneration system 95 of FIG. 3, may be implemented to ensure acceptable cooling of the fluid mixture described above during diesel particulate filter regeneration. Specifically, the electronic control module 97 may be in control communication with the active regeneration system 95 and may include a regeneration control algorithm operable to detect a speed of the blower fan 124. Such a strategy may be specifically applicable to a machine, such as the skid steer machine 10, utilizing the mixing strategy described above. According to such an embodiment, the electronic control module 97 may include a regeneration detection algorithm operable to detect a soot buildup threshold within the diesel particulate filter 54. Specifically, the electronic control module 97 may be in control communication with the backpressure sensor 98, or temperature sensor, of the active regeneration system to detect the soot buildup threshold. However, alternative means for detecting the soot buildup threshold, which may represent a buildup amount beyond which performance of the internal combustion engine 50 may be negatively impacted, are also contemplated. The regeneration detection algorithm may run continuously to detect when the diesel particulate filter 54 is in need of regeneration.

Figure 10:
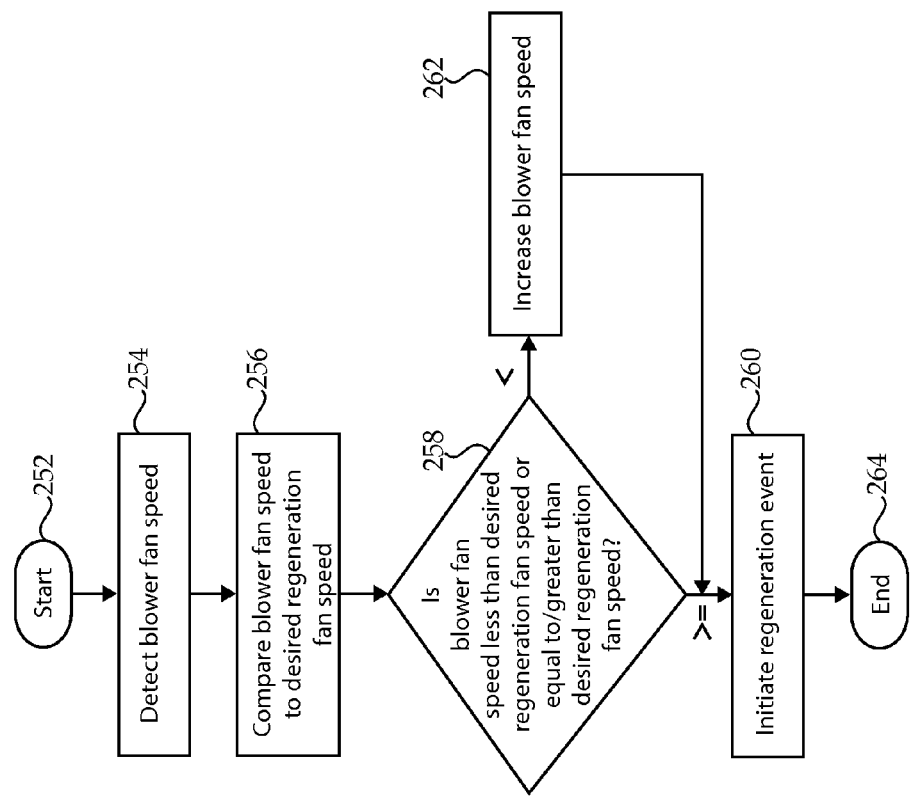
FIG. 10 is a flow chart of one embodiment of a method of controlling a regeneration event, according to another aspect of the present disclosure.

When the regeneration detection algorithm detects a need for regeneration, the algorithm may be operable to initiate the regeneration control algorithm. Specifically, such initiation may be in response to detection of the soot buildup threshold. Referring to FIG. 10, flow chart 250 represents an exemplary method of controlling a regeneration event of the diesel particulate filter 54. The method begins at a START, Box 252. From Box 252, the method may proceed to Box 254, which includes a step of detecting a speed of the blower fan 124, which is preferably an electronically controlled blower fan. The blower fan speed may then be compared to a desired regeneration fan speed, at Box 256. The desired regeneration fan speed may be stored in memory and may be selected to maintain a temperature of the fluid mixture at the perimeter 238 of the high temperature zone 234 below 200 degrees Celsius or, more preferably, below 150 degrees Celsius. The desired regeneration fan speed may be selected based on temperatures and velocities of air exiting the cooling package 150 and the exhaust stack 102 and may take into consideration any of a number of relevant factors.

The regeneration control algorithm may be further operable to trigger a regeneration event if the speed of the blower fan 124 is equal to or greater than the desired regeneration fan speed. Specifically, if it is determined at Box 258 that the blower fan speed is equal to or greater than the desired regeneration fan speed, the method proceeds to Box 260 and active regeneration is initiated. For example, if it is determined that the speed of the blower fan 124 is sufficient to achieve fluid mixture temperatures below 200 degrees Celsius or, preferably, below 150 degrees Celsius at the perimeter 238 of the high temperature zone 234 and regeneration is needed, the active regeneration of the diesel particulate filter 54 may be initiated.

However, if it is determined at Box 258 that the speed of the blower fan 124 is less than the desired regeneration fan speed, the speed of the blower fan 124 may be increased at Box 262. For example, the blower fan speed may be increased to at least the desired regeneration fan speed, and then regeneration may be initiated at Box 260. According to one embodiment, the electronic controller 97 may send a signal to electronically controlled blower fan 124 to increase the blower fan speed to the desired regeneration fan speed. After regeneration has been initiated, the method proceeds to an END, Box 264.

Figure 11:
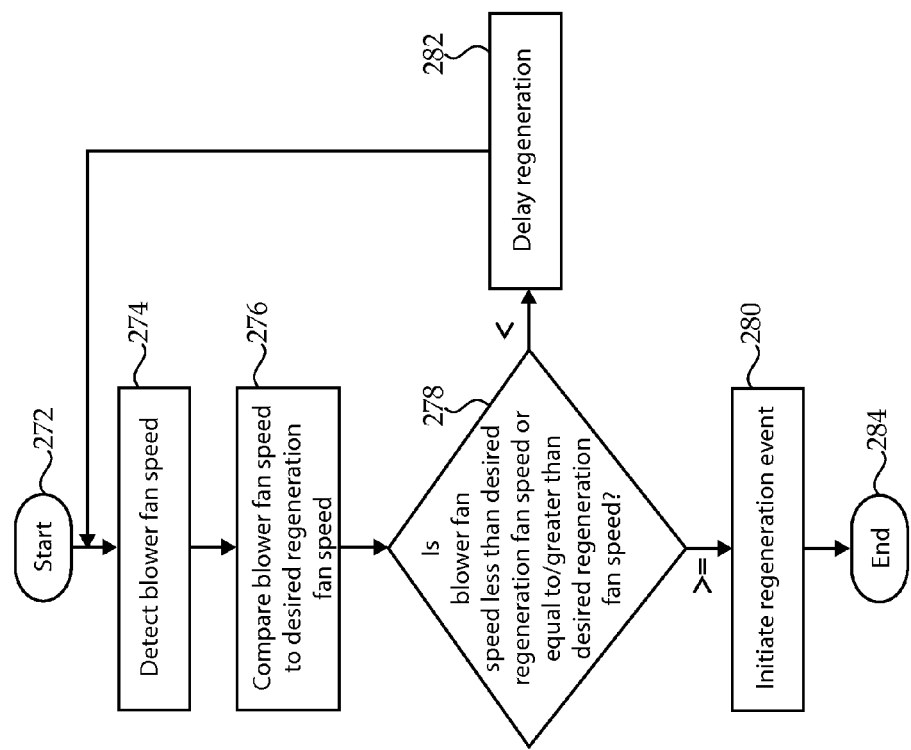
FIG. 11 is a flow chart of another embodiment of a method of controlling a regeneration event, according to another aspect of the present disclosure.

An alternative method of controlling a regeneration event of the diesel particulate filter 54 is shown in a flow chart 270 of FIG. 11. The alternative method begins at a START, Box 272. From Box 272, the method may proceed to Box 274, which includes a step of detecting a speed of the blower fan 124. The blower fan speed may then be compared to a desired regeneration fan speed, at Box 276. If it is determined at Box 278 that the blower fan speed is equal to or greater than the desired regeneration fan speed, the method proceeds to Box 280 and the regeneration event is initiated.

However, if it is determined at Box 278 that the speed of the blower fan 124 is less than the desired regeneration fan speed, the regeneration control algorithm may be operable to delay a regeneration event, at Box 282. Specifically, even though regeneration is needed, diesel particulate filter regeneration may be delayed for a predetermined period of time or until one or more preconditions are met. For example, regeneration may be delayed until the blower fan speed is sufficient to achieve the desired fluid mixture temperatures at the perimeter 238 of the high temperature zone 234 during diesel particulate filter regeneration. The regeneration control algorithm may detect the blower fan speed at predetermined intervals and proceed with regeneration, at Box 280, when the blower fan speed is equal to or greater than the desired regeneration fan speed. After regeneration has been initiated, the method proceeds to an END, Box 284.

INDUSTRIAL APPLICABILITY

The present disclosure may find particular applicability to exhaust systems and cooling systems of machines. Further, the present disclosure may be particularly applicable to machines with exhaust systems incorporating a diesel particulate filter. The present disclosure may be specifically applicable to skid steer machines, or the like, requiring a diesel particulate filter positioned within the space constraints of a rear mounted engine compartment.

Referring to FIGS. 1-11, an exemplary embodiment of a skid steer machine 10 includes an operator cage 12 supported on a skid steer machine frame 14, a pair of lift arms 16 pivotably attached to the skid steer machine frame 14 behind the operator cage 12 and extending longitudinally on both sides 18 of the operator cage 12, and a rear mounted engine compartment 26 supported on the skid steer machine frame 14. The rear mounted engine compartment 26 includes an internal combustion engine 50, a diesel particulate filter 54 fluidly connected to the internal combustion engine 50 and positioned between the internal combustion engine 50 and the operator cage 12, and a cooling package 58 having a predominantly horizontal orientation. The cooling package 58, which may include a unitary assembly 152, is at a higher location within the rear mounted engine compartment 26 than the diesel particulate filter 54.

During operation of the skid steer machine 10, and according to the exemplary embodiment provided herein, the rear mounted engine compartment 26, including the area surrounding the diesel particulate filter 54, may be cooled using the horizontally oriented cooling package 58. Specifically, the blower fan 124 may draw ambient air through the rear facing grille 68 and around components of the rear mounted engine compartment 26 before exhausting the cooling air through the top portion 40 of the rear mounted engine compartment 26. This cooling air drawn through the rear mounted engine compartment 26 may be drawn into the exhaust stack 102 downstream of the diesel particulate filter 54 through the venturi opening 108 to cool exhaust gas expelled from the internal combustion engine 50. The cooled exhaust gas, which may still have a temperature exceeding 300 degrees Celsius, particularly during an active regeneration of the diesel particulate filter 54, is exhausted through the top portion 40 of the rear mounted engine compartment 26.

The high temperature exhaust exiting the rear mounted engine compartment 26 may be mixed with the cooling air exhausted from the cooling package 58. Specifically, the exhaust stack 102 may be positioned in close enough proximity to the outlet 232 of the cooling package 58 that the exhaust gas may be directed into the cooling air. According to a specific example, the exhaust gas exiting the exhaust stack outlet 230 may define a vector $V_1$ that intersects with a cooling air vector $V_2$ defined by the cooling air exiting the cooling package outlet 232. The exhaust gas and cooling package air mix within a high temperature zone 234, which may include a sphere 236 surrounding the exhaust stack outlet 230, to form a fluid mixture. This mixing strategy, as described herein, may cool the exhaust gas such that the temperature of the fluid mixture at the perimeter 238 of the high temperature zone 234 is below 200 degrees Celsius and, preferably, may be below 150 degrees Celsius.

A regeneration detection algorithm may run continuously on an electronic control module, such as, for example, electronic control module 97, to detect a soot buildup threshold of the diesel particulate filter 54. This soot buildup threshold, which may indicate a need for diesel particulate filter regeneration, may initiate a regeneration control algorithm of the electronic control module 97. The regeneration control algorithm may be operable to detect a speed of the blower fan 124 and compare it to a desired regeneration fan speed to determine whether the current blower fan speed is sufficient to cool the exhaust gas exiting the exhaust stack outlet 230 as described above. If the current blower fan speed is acceptable, active regeneration of the diesel particulate filter 54 may be initiated. However, if the current blower fan speed is determined to be insufficient, the regeneration control algorithm may increase the speed of the blower fan 124 to match or exceed the desired regeneration fan speed. Alternatively, the regeneration control algorithm may delay active regeneration of the diesel particulate filter 54 until the blower fan speed is sufficient.

During operation of the skid steer machine 10, at least one non-metallic vibration isolator, discussed above, may be positioned between the cooling package 150 and the skid steer machine frame 14 to isolate the cooling package 150 from vibrations of the skid steer machine frame 14. After operation of the skid steer machine 10, the internal combustion engine 50 may be stopped and one or more maintenance tasks may be performed. To improve access to components within the rear mounted engine compartment 26, the cooling package 150, which may include the unitary assembly 152 described above, may be pivoted from an operational position (shown in FIG. 7) to a maintenance position (shown in FIG. 8). Specifically, according to the exemplary embodiment, a pair of stationary mounting assemblies 194 may be unfastened and the cooling package 150 may be pivoted about a centrally located pivot axis $A_4$ using a pair of pivotable mounting assemblies 182. The maintenance position may be maintained using a prop rod assembly 210 or other similar structure.

By packaging the diesel particulate filter 54 within the rear mounted engine compartment 26 as disclosed herein, the likelihood of an operator or bystander inadvertently contacting the diesel particulate filter 54, which can reach very high temperatures, is reduced. Specifically, the diesel particulate filter 54 is inaccessible from the back portion 46, or rear, because it is blocked by the internal combustion engine 50, and is blocked from the sides 48 by the pair of sidewalls 32. This is particularly useful during regeneration of the diesel particulate filter 54, when temperatures of the exhaust traveling through the diesel particulate filter 54 may reach 600 degrees Celsius. The double wall arrangement, including the firewall 62, serves to reduce heat transmission into the operator cage 12. The orientation and positioning of the cooling package 58 is selected to achieve desired cooling of the rear mounted engine compartment 26, including the area and components surrounding the diesel particulate filter 54. The venturi opening 108 assists in moving air upward in the area surrounding the diesel particulate filter 54, thus cooling components in close proximity to the diesel particulate filter 54.

According to another aspect, a cooling package 150 may be provided as a unitary assembly 152. As such, the cooling package 150 may be produced and shipped separately from the skid steer machine 10 and may be mounted to the skid steer machine frame 14 at a later time. The unitary assembly 152 may be pivotably mounted to the skid steer machine frame 14 such that it is pivotable between the operational position of the cooling package 150 and the maintenance position of the cooling package 150. In addition, the cooling package 150, which does not include a frame, may include one or more non-metallic vibration isolators, which isolate the cooling package 150 from vibrations of the skid steer machine frame 14. According to the exemplary embodiment, the mounting assemblies 182 and 194 may provide the only attachment of cooling package 150 to skid steer machine frame 14, except for any necessary fluid or electrical connections, and may include the non-metallic vibration isolation elements 192 and 200. By utilizing the non-metallic vibration isolation elements 192 and 200 described herein, as opposed to a cooling package frame, to isolate the cooling package 150 from movements of the skid steer machine frame 14, the space that may have been occupied by the cooling package frame may be used by one or more heat exchangers 154, 156, and 162. Specifically, the one or more heat exchangers 154, 156, and 162 may have an increased size and, as a result, increased heat transfer capabilities, which may be particularly useful in skid steer machines having limited space constraints and additional exhaust aftertreatment requirements.

According to another aspect, the exhaust gas exiting the exhaust stack outlet 230 may be directed into the air exiting the cooling package outlet 232. By mixing the exhaust gas and the cooling air to form a fluid mixture, a temperature of the fluid mixture at a perimeter 238 of a high temperature zone 234 may be significantly reduced. Specifically, according to some embodiments, the temperature of the fluid mixture at the perimeter 238 of the high temperature zone 234 may be at or below 150 degrees Celsius, even during active regeneration of the diesel particulate filter 54. This may help reduce high temperature exposure for operators, bystanders, or flammable materials that are in close proximity of the skid steer machine 10 during its operation.

According to yet another aspect, a control strategy may be provided to ensure a sufficient speed of the blower fan 124 during regeneration of the diesel particulate filter 54. Specifically, the control strategy may be operable to determine when regeneration is needed and, in response, detect the blower fan speed. If the blower fan speed is equal to or above a desired regeneration fan speed, the regeneration event may be initiated. Otherwise, an alternative control strategy may be implemented. For example, the speed of the blower fan 124 may be increased to at least the desired regeneration fan speed, or, alternatively, the regeneration event may be delayed until the blower fan speed is acceptable.

Although aspects of the present disclosure were described with reference to skid steer machine 10, it should be appreciated that many of the features and advantages described herein may have broad applicability across a wide range of machines. For example, many of the features described herein may be applicable to wheel loaders, off highway trucks, articulated trucks, and the like.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A machine, comprising:
   a machine frame;
   an internal combustion engine disposed within an engine compartment and supported on the machine frame;
   an exhaust stack having an inlet fluidly connected to an exhaust manifold of the internal combustion engine and an outlet in fluid communication with ambient air, wherein a diesel particulate filter is disposed along the exhaust stack;
   an active regeneration system for regenerating the diesel particulate filter;
   a cooling package including at least one heat exchanger and a blower fan, wherein the blower fan is configured to blow cooling air from the engine compartment sequentially through the at least one heat exchanger and an outlet of the cooling package;
   wherein exhaust gas exiting the exhaust stack outlet is mixed with the cooling air exiting the cooling package outlet in a high temperature zone surrounding the exhaust stack outlet to form a fluid mixture; and
   an electronic control module in control communication with the active regeneration system and including a regeneration control algorithm operable to detect a speed of the blower fan.

2. The machine of claim 1, wherein the electronic control module further includes a regeneration detection algorithm operable to detect a soot buildup threshold within the diesel particulate filter.

3. The machine of claim 2, wherein the active regeneration system includes a backpressure sensor positioned along the exhaust stack, wherein the electronic control module is in control communication with the backpressure sensor.

4. The machine of claim 2, wherein the regeneration detection algorithm is operable to initiate the regeneration control algorithm responsive to the soot buildup threshold.

5. The machine of claim 4, further including a fan speed sensor configured to detect the speed of the blower fan.

6. The machine of claim 4, wherein the regeneration control algorithm is operable to compare the speed of the blower fan to a desired regeneration fan speed.

7. The machine of claim 6, wherein the desired regeneration fan speed is selected to maintain a temperature of the fluid mixture at a perimeter of the high temperature zone below 200 degrees Celsius.

8. The machine of claim 6, wherein the regeneration control algorithm is operable to trigger a regeneration event if the speed of the blower fan is equal to or greater than the desired regeneration fan speed.

9. The machine of claim 6, wherein the regeneration control algorithm is operable to increase the speed of the blower fan toward the desired regeneration fan speed if the speed of the blower fan is less than the desired regeneration fan speed.

10. The machine of claim 9, wherein the blower fan is an electronically controlled blower fan.

11. The machine of claim 6, wherein the regeneration control algorithm is operable to delay a regeneration event if the speed of the blower fan is less than the desired regeneration fan speed.

12. The machine of claim 6, wherein the exhaust gas exiting the exhaust stack outlet defines an exhaust gas vector that intersects an upwardly extending cylinder defined by the blower fan within the high temperature zone.

13. A method of operating a machine, wherein the machine includes an internal combustion engine disposed within an engine compartment and supported on a machine frame, an exhaust stack having an inlet fluidly connected to an exhaust manifold of the internal combustion engine and an outlet in fluid communication with ambient air, wherein a diesel particulate filter is disposed along the exhaust stack, an active regeneration system for regenerating the diesel particulate filter, a cooling package including at least one heat exchanger and a blower fan, wherein the blower fan is configured to blow cooling air from the engine compartment sequentially through the at least one heat exchanger and an outlet of the cooling package, and an electronic control module in control communication with the active regeneration system and including a regeneration control algorithm operable to detect a speed of the blower fan, the method including the steps of:
   exhausting the cooling air from the blower fan through the cooling package outlet;
   exhausting exhaust gas through the exhaust stack outlet at an exhaust temperature above 300 degrees Celsius;
   mixing the exhaust gas with the cooling air in a high temperature zone surrounding the exhaust stack outlet to form a fluid mixture;
   executing a regeneration detection algorithm on the electronic control module; and
   executing the regeneration control algorithm on the electronic control module.

14. The method of claim 13, wherein the step of executing the regeneration detection algorithm includes:
   detecting a soot buildup threshold within the diesel particulate filter; and
   initiating the regeneration control algorithm responsive to the soot buildup threshold.

15. The method of claim 14, wherein the step of executing the regeneration control algorithm includes:

detecting the speed of the blower fan; and comparing the speed of the blower fan to a desired regeneration fan speed.

16. The method of claim 15, wherein the step of executing the regeneration control algorithm further includes triggering a regeneration event if the speed of the blower fan is equal to or greater than the desired regeneration fan speed.

17. The method of claim 15, wherein the step of executing the regeneration control algorithm further includes increasing the speed of the blower fan toward the desired regeneration fan speed if the speed of the blower fan is less than the desired regeneration fan speed.

18. The method of claim 15, wherein the step of executing the regeneration control algorithm further includes delaying a regeneration event if the speed of the blower fan is less than the desired regeneration fan speed.

19. The method of claim 15, wherein the mixing step includes reducing a temperature of the fluid mixture at a perimeter of the high temperature zone below 200 degrees Celsius.

20. The method of claim 19, wherein the step of exhausting the exhaust gas includes directing the exhaust gas into the cooling air exhausted through the cooling package outlet within the high temperature zone.

* * * * *

UNITED STATES PATENT AND TRADEMARK OFFICE
CERTIFICATE OF CORRECTION

| | | |
|---|---|---|
| PATENT NO. | : 8,479,498 B2 | Page 1 of 1 |
| APPLICATION NO. | : 12/938775 | |
| DATED | : July 9, 2013 | |
| INVENTOR(S) | : Smith et al. | |

It is certified that error appears in the above-identified patent and that said Letters Patent is hereby corrected as shown below:

In the Specification

Column 11, line 52, delete "flow chart 250 represents" and insert -- the flow chart represents --.

Column 12, lines 25-26, delete "a flow chart 270 of FIG. 11." and insert -- a flow chart of FIG. 11. --.

Signed and Sealed this
Twenty-fifth Day of August, 2015

Michelle K. Lee
*Director of the United States Patent and Trademark Office*